United States Patent
Nam et al.

(10) Patent No.: US 8,718,003 B2
(45) Date of Patent: May 6, 2014

(54) SYSTEM AND METHOD FOR AN UPLINK CONTROL SIGNAL IN WIRELESS COMMUNICATION SYSTEMS

(75) Inventors: Young-Han Nam, Richardson, TX (US); Jianzhong Zhang, Plano, TX (US)

(73) Assignee: Samsung Electronics Co., Ltd., Suwon-Si (KR)

(*) Notice: Subject to any disclaimer, the term of this patent is extended or adjusted under 35 U.S.C. 154(b) by 48 days.

(21) Appl. No.: 13/525,095

(22) Filed: Jun. 15, 2012

(65) Prior Publication Data

US 2012/0320847 A1 Dec. 20, 2012

Related U.S. Application Data

(60) Provisional application No. 61/498,989, filed on Jun. 20, 2011.

(51) Int. Cl.
*H04W 72/04* (2009.01)
*H04W 72/12* (2009.01)
*H04W 36/00* (2009.01)
*H04W 36/20* (2009.01)

(52) U.S. Cl.
USPC ........... 370/329; 370/252; 455/63.1; 455/450

(58) Field of Classification Search
USPC ......... 370/252, 282, 328, 329, 330, 331, 338, 370/254; 455/39, 63.1, 36, 443, 450, 452.1, 455/501, 509; 375/260, 295, 316, 346
See application file for complete search history.

(56) References Cited

U.S. PATENT DOCUMENTS

| | | | | |
|---|---|---|---|---|
| 8,208,438 B2* | 6/2012 | Han et al. | | 370/330 |
| 8,514,826 B2* | 8/2013 | Han et al. | | 370/338 |
| 2010/0271970 A1 | 10/2010 | Pan et al. | | |
| 2010/0311458 A1* | 12/2010 | Nakao et al. | | 455/517 |
| 2011/0045860 A1 | 2/2011 | Nam et al. | | |
| 2011/0090825 A1 | 4/2011 | Papasakellariou et al. | | |
| 2011/0170436 A1* | 7/2011 | Doan et al. | | 370/252 |
| 2011/0216732 A1* | 9/2011 | Maeda et al. | | 370/329 |
| 2011/0243066 A1* | 10/2011 | Nayeb Nazar et al. | | 370/328 |
| 2011/0268028 A1* | 11/2011 | Stern-Berkowitz et al. | | 370/328 |
| 2012/0113831 A1* | 5/2012 | Pelletier et al. | | 370/252 |
| 2012/0320848 A1* | 12/2012 | Chen et al. | | 370/329 |
| 2013/0242911 A1* | 9/2013 | Heo et al. | | 370/329 |

OTHER PUBLICATIONS

International Search Report dated Jan. 24, 2013 in connection with International Application No. PCT/KR2012/004873, 3 pages.

* cited by examiner

*Primary Examiner* — Ahmed Elallam

(57) ABSTRACT

A user equipment is capable of receiving communications from a cell including at least one base station. The user equipment includes a receiver configured to receive from the base station both a cell specific radio resource control (RRC) configuration comprising a cell specific resource offset parameter for a PUCCH HARQ-ACK, and a UE specific RRC configuration comprising a UE specific RS base sequence parameter and an UE specific resource offset parameter for the PUCCH HARQ-ACK.

21 Claims, 6 Drawing Sheets

SYSTEM AND METHOD FOR AN UPLINK CONTROL SIGNAL IN WIRELESS COMMUNICATION SYSTEMS

CROSS-REFERENCE TO RELATED APPLICATION(S) AND CLAIM OF PRIORITY

The present application is related to U.S. Provisional Patent No. 61/498,989, filed Jun. 20, 2011, entitled "METHODS AND APPARATUS ON UPLINK REFERENCE SIGNALS". Provisional Patent No. 61/498,989 is assigned to the assignee of the present application and is hereby incorporated by reference into the present application as if fully set forth herein. The present application hereby claims priority under 35 U.S.C. §119(e) to U.S. Provisional Patent No. 61/498,989.

TECHNICAL FIELD OF THE INVENTION

The present application relates generally to wireless communications and, more specifically, to a system and method for uplink acknowledgement transmissions.

BACKGROUND OF THE INVENTION

Modern communications demand higher data rates and performance. Multiple input, multiple output (MIMO) antenna systems, also known as multiple-element antenna (MEA) systems, achieve greater spectral efficiency for allocated radio frequency (RF) channel bandwidths by utilizing space or antenna diversity at both the transmitter and the receiver, or in other cases, the transceiver.

In MIMO systems, each of a plurality of data streams is individually mapped and modulated before being precoded and transmitted by different physical antennas or effective antennas. The combined data streams are then received at multiple antennas of a receiver. At the receiver, each data stream is separated and extracted from the combined signal. This process is generally performed using a minimum mean squared error (MMSE) or MMSE-successive interference cancellation (SIC) algorithm.

In $3^{rd}$ Generation Partnership Project (3GPP) Long Term Evolution (LTE) systems, the base station transmits a Downlink (DL) grant to a subscriber station in a Physical Downlink Control Channel (PDCCH). Some frames later, the subscriber station transmits an Acknowledgement (ACK) or Negative Acknowledgement (NACK) to the base station.

SUMMARY OF THE INVENTION

A wireless communications network including a plurality of cell including at least one base station is provided. The base station includes a transmitter configured to transmit to the user equipment both a cell specific radio resource control (RRC) configuration comprising a cell specific resource offset parameter for a physical uplink control channel (PUCCH) carrying an hybrid automatic repeat request (HARQ)-acknowledgement (ACK), and a user equipment (UE) specific RRC configuration comprising a UE specific RS base sequence parameter and an UE specific resource offset parameter for the PUCCH HARQ-ACK. The base station further includes a receiver configured to receive the PUCCH carrying the HARQ-ACK information which is generated based on either the cell specific RRC configuration or the UE specific RRC configuration.

A user equipment capable of receiving communications from a cell including at least one base station is provided. The user equipment includes a receiver configured to receive from the base station both a cell specific radio resource control (RRC) configuration comprising a cell specific resource offset parameter for a PUCCH carrying an HARQ-ACK, and a UE specific RRC configuration comprising a UE specific RS base sequence parameter and an UE specific resource offset parameter for the PUCCH carrying the HARQ-ACK. The user equipment further includes a transmitter configured to transmit the PUCCH carrying the HARQ-ACK information which is generated based on either the cell specific RRC configuration or the UE specific RRC configuration.

A method for interference mitigation is provided. The method includes transmitting to a user equipment both a cell specific radio resource control (RRC) configuration comprising a cell specific resource offset parameter for a PUCCH carrying an HARQ-ACK, and a specific RRC configuration comprising a UE specific RS base sequence parameter and an UE specific resource offset parameter for the PUCCH carrying the HARQ-ACK. The method further includes receiving the PUCCH which is generated based on either the cell specific RRC configuration or the UE specific RRC configuration.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications network.

With regard to the following description, it is noted that the 3GPP Long Term Evolution (LTE) term "node B" is another term for "base station" used below. Also, the LTE term "user equipment" or "UE" is another term for "subscriber station" used below.

The following standards descriptions are hereby incorporated into the present disclosure as if fully set forth herein: 3GPP Technical Specification No. 36.211, version 10.1.0, "E-UTRA, Physical Channels And Modulation"; 3GPP Technical Specification No. 36.212, version 10.1.0, "E-UTRA, Multiplexing And Channel Coding"; and 3GPP Technical Specification No. 36.213, version 10.1.0, "E-UTRA, Physical Layer Procedures".

Figure 1:
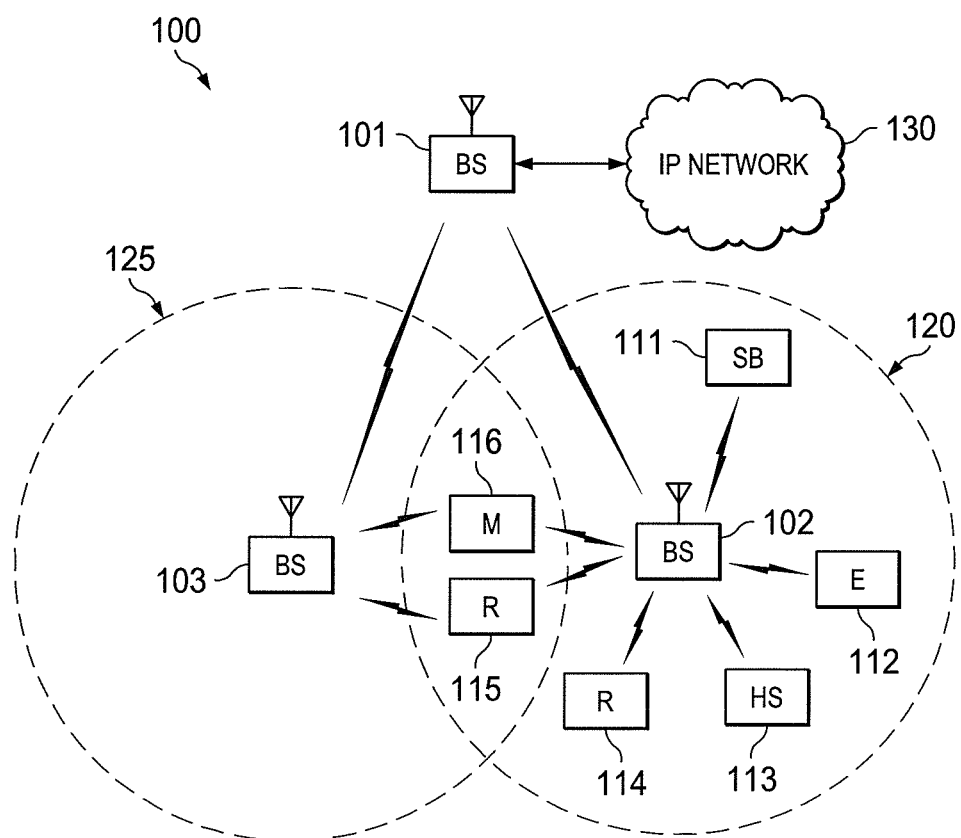
FIG. 1 illustrates an Orthogonal Frequency Division Multiple Access (OFDMA) wireless network that is capable of decoding data streams according to embodiments of the present disclosure.

FIG. 1 illustrates exemplary wireless network 100 that is capable of decoding data streams according to one embodiment of the present disclosure. In the illustrated embodiment, wireless network 100 includes base station (BS) 101, base station (BS) 102, and base station (BS) 103. Base station 101 communicates with base station 102 and base station 103. Base station 101 also communicates with Internet protocol (IP) network 130, such as the Internet, a proprietary IP network, or other data network.

Base station 102 provides wireless broadband access to network 130, via base station 101, to a first plurality of user equipments within coverage area 120 of base station 102. The first plurality of user equipments includes user equipment (UE) 111, user equipment (UE) 112, user equipment (UE) 113, user equipment (UE) 114, user equipment (UE) 115 and user equipment (UE) 116. User equipment (UE) may be any wireless communication device, such as, but not limited to, a mobile phone, mobile PDA and any mobile station (MS). In an exemplary embodiment, UE 111 may be located in a small business (SB), UE 112 may be located in an enterprise (E), UE 113 may be located in a Wi-Fi hotspot (HS), UE 114 may be located in a first residence, UE 115 may be located in a second residence, and UE 116 may be a mobile (M) device.

Base station 103 provides wireless broadband access to network 130, via base station 101, to a second plurality of user equipments within coverage area 125 of base station 103. The second plurality of user equipments includes user equipment 115 and user equipment 116. In alternate embodiments, base stations 102 and 103 may be connected directly to the Internet by means of a wired broadband connection, such as an optical fiber, DSL, cable or T1/E1 line, rather than indirectly through base station 101.

In other embodiments, base station 101 may be in communication with either fewer or more base stations. Furthermore, while only six user equipments are shown in FIG. 1, it is understood that wireless network 100 may provide wireless broadband access to more than six user equipments. It is noted that user equipment 115 and user equipment 116 are on the edge of both coverage area 120 and coverage area 125. User equipment 115 and user equipment 116 each communicate with both base station 102 and base station 103 and may be said to be operating in handoff mode, as known to those of skill in the art.

In an exemplary embodiment, base stations 101-103 may communicate with each other and with user equipments 111-116 using an IEEE-802.16 wireless metropolitan area network standard, such as, for example, an IEEE-802.16e standard. In another embodiment, however, a different wireless protocol may be employed, such as, for example, a HIPERMAN wireless metropolitan area network standard. Base station 101 may communicate through direct line-of-sight or non-line-of-sight with base station 102 and base station 103, depending on the technology used for the wireless backhaul. Base station 102 and base station 103 may each communicate through non-line-of-sight with user equipments 111-116 using OFDM and/or OFDMA technique user equipments.

Base station 102 may provide a T1 level service to user equipment 112 associated with the enterprise and a fractional T1 level service to user equipment 111 associated with the small business. Base station 102 may provide wireless backhaul for user equipment 113 associated with the Wi-Fi hotspot, which may be located in an airport, café, hotel, or college campus. Base station 102 may provide digital subscriber line (DSL) level service to user equipments 114, 115 and 116.

User equipments 111-116 may use the broadband access to network 130 to access voice, data, video, video teleconferencing, and/or other broadband services. In an exemplary embodiment, one or more of user equipments 111-116 may be associated with an access point (AP) of a Wi-Fi WLAN. User equipment 116 may be any of a number of mobile devices, including a wireless-enabled laptop computer, personal data assistant, notebook, handheld device, or other wireless-enabled device. User equipments 114 and 115 may be, for example, a wireless-enabled personal computer, a laptop computer, a gateway, or another device.

Dotted lines show the approximate extents of coverage areas 120 and 125, which are shown as approximately circular for the purposes of illustration and explanation only. It should be clearly understood that the coverage areas associated with base stations, for example, coverage areas 120 and 125, may have other shapes, including irregular shapes, depending upon the configuration of the base stations and variations in the radio environment associated with natural and man-made obstructions.

Also, the coverage areas associated with base stations are not constant over time and may be dynamic (expanding or contracting or changing shape) based on changing transmission power levels of the base station and/or the user equipments, weather conditions, and other factors. In an embodiment, the radius of the coverage areas of the base stations, for example, coverage areas 120 and 125 of base stations 102 and 103, may extend in the range from less than 2 kilometers to about fifty kilometers from the base stations.

As is well known in the art, a base station, such as base station 101, 102, or 103, may employ directional antennas to support a plurality of sectors within the coverage area. In FIG. 1, base stations 102 and 103 are depicted approximately in the center of coverage areas 120 and 125, respectively. In other embodiments, the use of directional antennas may locate the base station near the edge of the coverage area, for example, at the point of a cone-shaped or pear-shaped coverage area.

The connection to network 130 from base station 101 may comprise a broadband connection, for example, a fiber optic line, to servers located in a central office or another operating company point-of-presence. The servers may provide communication to an Internet gateway for internet protocol-based communications and to a public switched telephone network gateway for voice-based communications. In the case of voice-based communications in the form of voice-over-IP (VoIP), the traffic may be forwarded directly to the Internet gateway instead of the PSTN gateway. The servers, Internet gateway, and public switched telephone network gateway are not shown in FIG. 1. In another embodiment, the connection to network 130 may be provided by different network nodes and equipment.

In accordance with an embodiment of the present disclosure, one or more of base stations 101-103 and/or one or more of user equipments 111-116 comprises a receiver that is operable to decode a plurality of data streams received as a combined data stream from a plurality of transmit antennas using an MMSE-SIC algorithm. As described in more detail below, the receiver is operable to determine a decoding order for the data streams based on a decoding prediction metric for each data stream that is calculated based on a strength-related characteristic of the data stream. Thus, in general, the receiver is able to decode the strongest data stream first, followed by the next strongest data stream, and so on. As a result, the decoding performance of the receiver is improved as compared to a receiver that decodes streams in a random or pre-determined order without being as complex as a receiver that searches all possible decoding orders to find the optimum order.

Figure 2A:
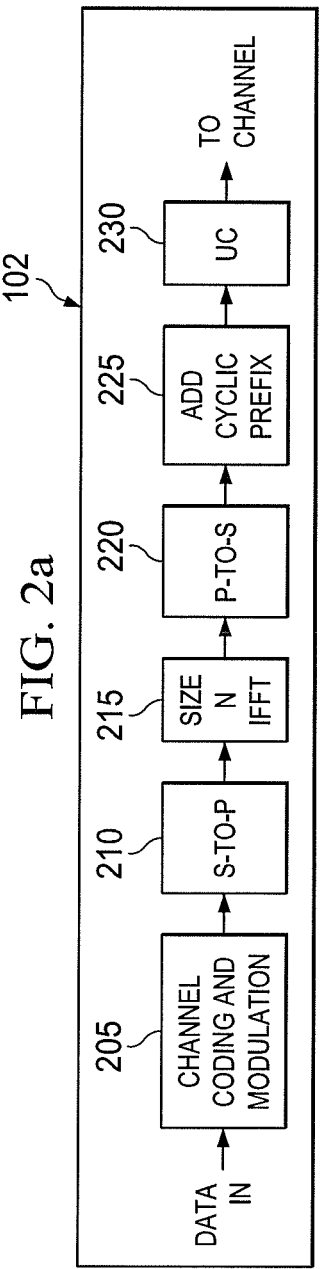
FIG. 2A is a high-level diagram of an OFDMA transmitter according to embodiments of the present disclosure.
Figure 2B:
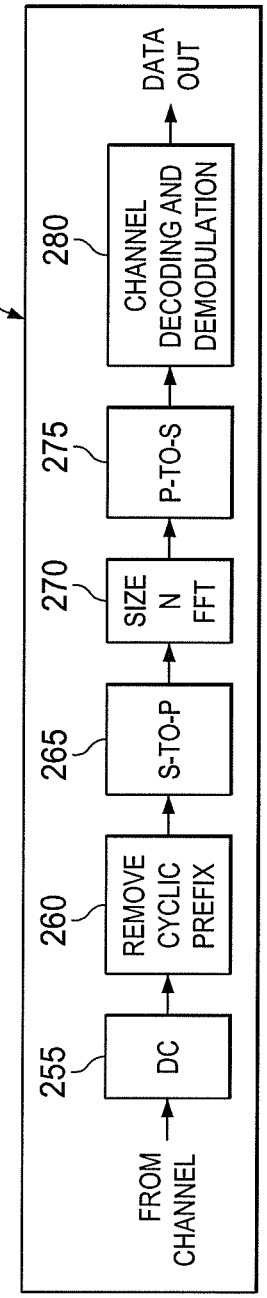
FIG. 2B is a high-level diagram of an OFDMA receiver according to embodiments of the present disclosure.

FIG. 2A is a high-level diagram of an orthogonal frequency division multiple access (OFDMA) transmit path. FIG. 2B is a high-level diagram of an orthogonal frequency division multiple access (OFDMA) receive path. In FIGS. 2A and 2B, the OFDMA transmit path is implemented in base station (BS) 102 and the OFDMA receive path is implemented in user equipment (UE) 116 for the purposes of illustration and explanation only. However, it will be understood by those skilled in the art that the OFDMA receive path may also be implemented in BS 102 and the OFDMA transmit path may be implemented in UE 116.

The transmit path in BS 102 comprises channel coding and modulation block 205, serial-to-parallel (S-to-P) block 210, Size N Inverse Fast Fourier Transform (IFFT) block 215, parallel-to-serial (P-to-S) block 220, add cyclic prefix block 225, up-converter (UC) 230. The receive path in UE 116 comprises down-converter (DC) 255, remove cyclic prefix block 260, serial-to-parallel (S-to-P) block 265, Size N Fast Fourier Transform (FFT) block 270, parallel-to-serial (P-to-S) block 275, channel decoding and demodulation block 280.

At least some of the components in FIGS. 2A and 2B may be implemented in software while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In BS 102, channel coding and modulation block 205 receives a set of information bits, applies coding (e.g., Turbo coding) and modulates (e.g., QPSK, QAM) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and UE 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency.

The transmitted RF signal arrives at UE 116 after passing through the wireless channel and reverse operations to those at BS 102 are performed. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of base stations 101-103 may implement a transmit path that is analogous to transmitting in the downlink to user equipments 111-116 and may implement a receive path that is analogous to receiving in the uplink from user equipments 111-116. Similarly, each one of user equipments 111-116 may implement a transmit path corresponding to the architecture for transmitting in the uplink to base stations 101-103 and may implement a receive path corresponding to the architecture for receiving in the downlink from base stations 101-103.

The present disclosure describes methods and systems to convey information relating to base station configuration to user equipments and, more specifically, to relaying base station antenna configuration to user equipments. This information can be conveyed through a plurality of methods, including placing antenna configuration into a quadrature-phase shift keying (QPSK) constellation (e.g., n-quadrature amplitude modulation (QAM) signal, wherein n is $2^x$) and placing antenna configuration into the error correction data (e.g., cyclic redundancy check (CRC) data). By encoding antenna information into either the QPSK constellation or the error correction data, the base stations 101-103 can convey base stations 101-103 antenna configuration without having to separately transmit antenna configuration. These systems and methods allow for the reduction of overhead while ensuring reliable communication between base stations 101-103 and a plurality of user equipments.

In some embodiments disclosed herein, data is transmitted using QAM. QAM is a modulation scheme that conveys data by modulating the amplitude of two carrier waves. These two waves are referred to as quadrature carriers, and are generally out of phase with each other by 90 degrees. QAM may be represented by a constellation that comprises $2^x$ points, where x is an integer greater than 1. In the embodiments discussed herein, the constellations discussed will be four point constellations (4-QAM). In a 4-QAM constellation a 2 dimensional graph is represented with one point in each quadrant of the 2 dimensional graph. However, it is explicitly understood that the innovations discussed herein may be used with any modulation scheme with any number of points in the constellation. It is further understood that with constellations with more than four points, additional information (e.g., reference power signal) relating to the configuration of the base stations 101-103 may be conveyed consistent with the disclosed systems and methods.

It is understood that the transmitter within base stations 101-103 performs a plurality of functions prior to actually transmitting data. In the 4-QAM embodiment, QAM modulated symbols are serial-to-parallel converted and input to an inverse fast Fourier transform (IFFT). At the output of the IFFT, N time-domain samples are obtained. In the disclosed embodiments, N refers to the IFFT/fast Fourier transform (FFT) size used by the OFDM system. The signal after IFFT is parallel-to-serial converted and a cyclic prefix (CP) is added to the signal sequence. The resulting sequence of samples is referred to as an OFDM symbol.

At the receiver within the user equipment, this process is reversed, and the cyclic prefix is first removed. Then the signal is serial-to-parallel converted before being fed into the FFT. The output of the FFT is parallel-to-serial converted, and the resulting QAM modulation symbols are input to the QAM demodulator.

The total bandwidth in an OFDM system is divided into narrowband frequency units called subcarriers. The number of subcarriers is equal to the FFT/IFFT size N used in the system. In general, the number of subcarriers used for data is less than N because some subcarriers at the edge of the frequency spectrum are reserved as guard subcarriers. In general, no information is transmitted on guard subcarriers.

Figure 3:
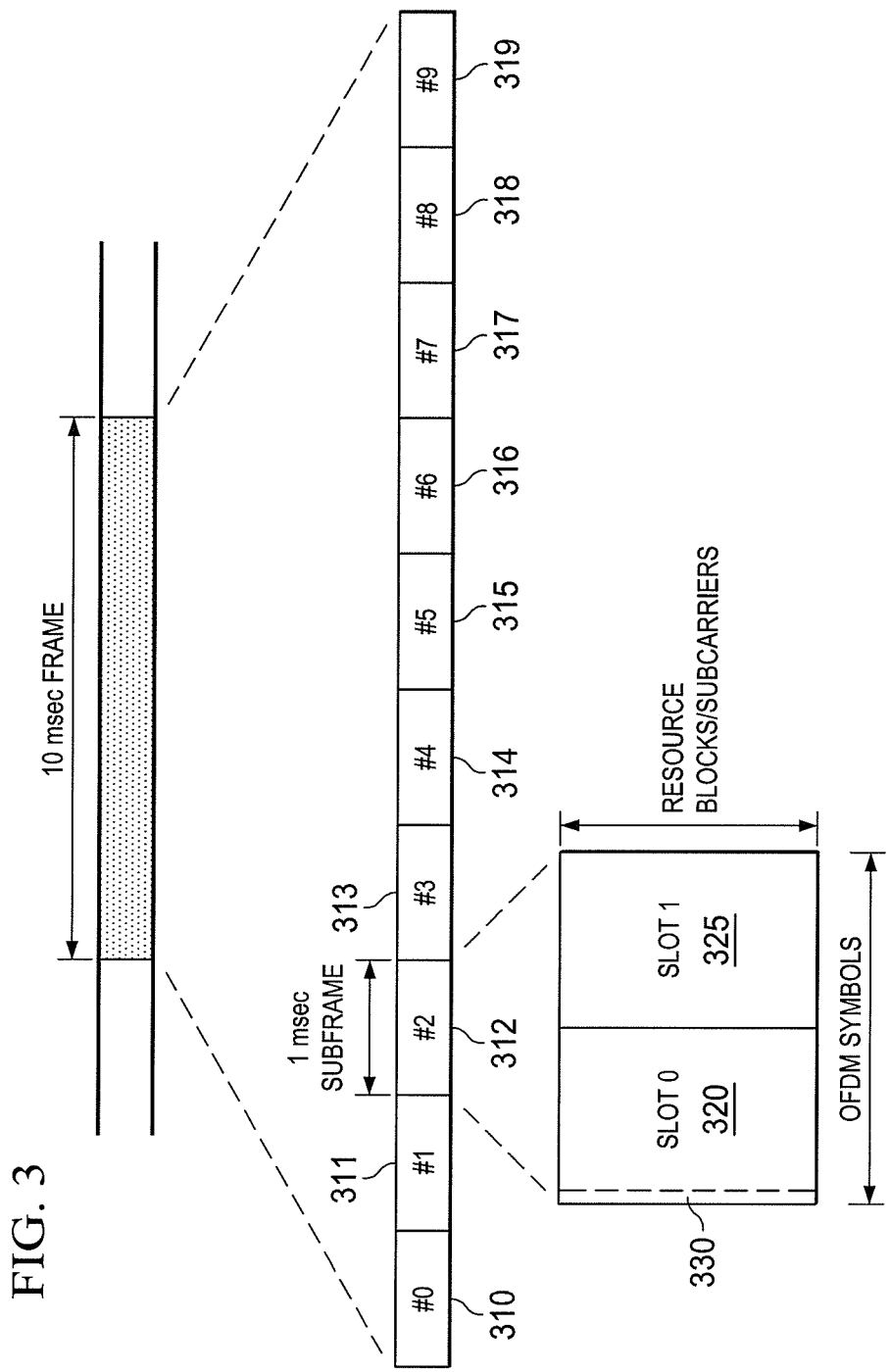
FIG. 3 illustrates an exemplary OFDM frame in the LTE system according to embodiments of the present disclosure.

FIG. 3 illustrates an exemplary OFDM frame in the LTE system according to embodiments of the present disclosure. The embodiment of the frame 300 shown in FIG. 3 is for illustration only. Other embodiments of the LTE frames could be used without departing from the scope of this disclosure.

Time resources in the LTE system are partitioned into ten millisecond (10 msec) frames 300. Each frame 300 is further partitioned into ten (10) sub-frames 310-319. Each sub-frame 310-319 further is divided into two time slots 320, 325. The two time slots 320, 325 are half a millisecond (0.5 msec) each.

Figure 4:
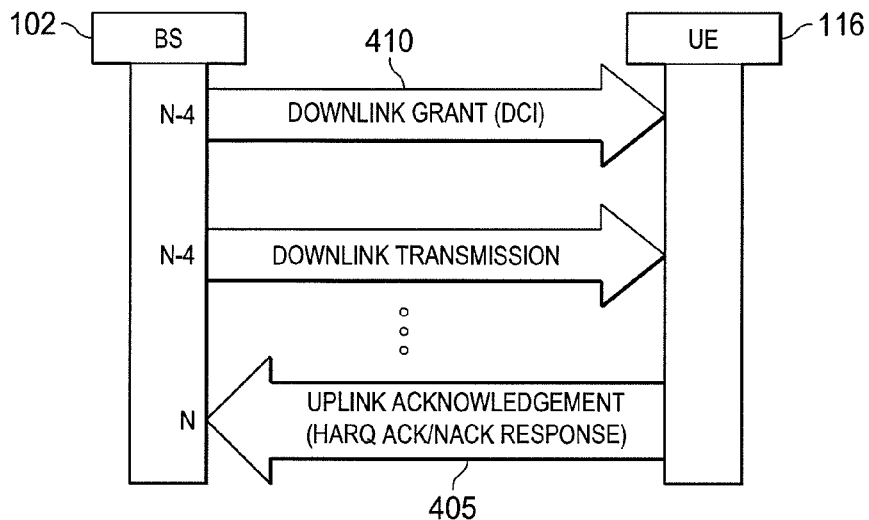
FIG. 4 illustrates a flow diagram for messages between a base station and a subscriber station according to embodiments of the present disclosure.

FIG. 4 illustrates a flow diagram for messages between a base station and a user equipment according to embodiments of the present disclosure. The embodiment of the flow diagram shown in FIG. 4 is for illustration only. Other embodiments of the flow diagram could be used without departing from the scope of this disclosure.

BS 102 schedules and initiates a DL transmission to UE 116. For each sub-frame 310-319 in the DL transmission, BS 102 sends DL Control Information (DCI) to UE 116 in the PDCCH. The DCI is located within the first few OFDM symbols in the sub-frame 310-319. For example, the DCI can be located in one or more of sub-frames 310, 311 and 312. The DCI can be located in one of the symbols, used as the DL carrier 330, in the time slot 320, 325 (as illustrated in FIG. 3). The DCI indicates the allocated RBs for UE 116 as well as additional information.

Upon reception of the DL grant targeted to UE 116, UE 116 attempts to decode the transmitted message regarding the allocated RBs. Depending upon the decoding results for each transmitted sub-frame 310-319, UE 116 sends hybrid-ARQ bits (or uplink ACK/NACK bits) to BS 102 a few sub-frames later. For example, in a Frequency-Division Duplex (FDD) system, UE 116 transmits the ACK/NACK response 405 in sub-frame n in response to the decoding result for the DCI 410 received in sub-frame n–4.

Figure 5:
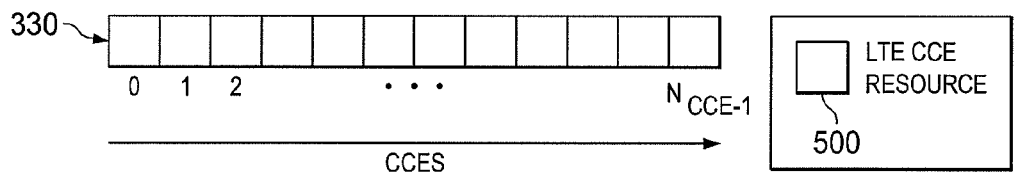
FIG. 5 illustrates Channel Control Element (CCE) resources in a DL carrier according to embodiments of the present disclosure.

FIG. 5 illustrates Channel Control Element (CCE) resources in a DL carrier. The embodiment of the CCEs 500 shown in FIG. 5 is for illustration only. Other embodiments of the CCEs could be used without departing from the scope of this disclosure.

A PDCCH that carries DCI is transmitted on an aggregation of one or several consecutive CCEs 500. The CCEs 500 available in the DL carrier 330 are numbered from 0 to $N_{CCE}-1$.

The CCEs 500 are control elements used for sending downlink grant. UE 116 reads the CCEs 500 to determine the downlink grant allocated to UE 116. For example, if CCE '012' is sent to UE 116, UE 116 determines that CCE '012' are allocated to UE 116. Therefore, UE 116 not only looks at the content of the CCE but also the location where the content is sent. Therefore, in some embodiments, UE 116 knows which resources to use to respond (e.g., ACK/NACK) based on what CCEs are used for the downlink grant.

Figure 6:
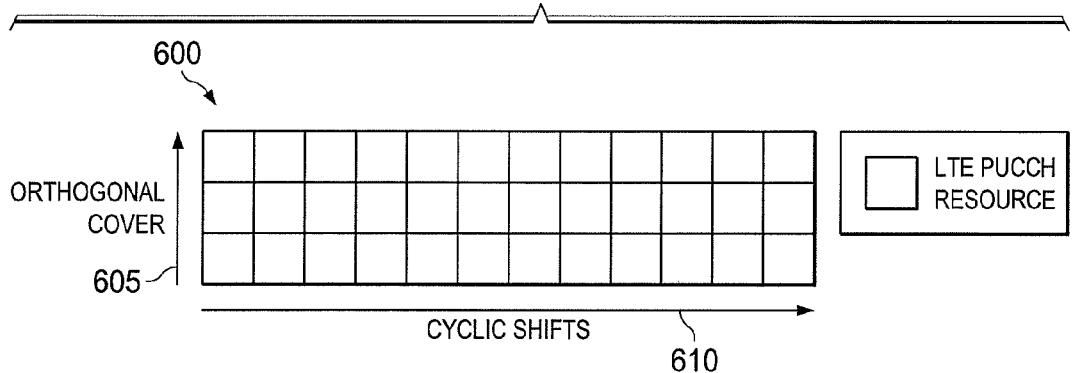
FIG. 6 illustrates an LTE Physical Uplink Control Channel (PUCCH) resource partition in on RB in the Uplink (UL) carrier according to embodiments of the present disclosure.

FIG. 6 illustrates an LTE Physical Uplink Control Channel (PUCCH) resource partition in on RB in the Uplink (UL) carrier. The embodiment of the PUCCH partition 600 shown in FIG. 6 is for illustration only. Other embodiments of the CCEs could be used without departing from the scope of this disclosure.

UL ACK/NACK (AN) bits are transmitted on PUCCH formats 1a and 1b. Resources used for transmission of PUCCH format 1a/1b are represented by the non-negative index $n_{PUCCH}^{(1)}$. PUCCH resource index $n_{PUCCH}^{(1)}$ for hybrid automatic repeat request (HARQ)-ACK/NCAK determines an orthogonal cover 605 and a cyclic shift 610. The orthogonal cover 605 and cyclic shift 610 indicate a unique resource. For example, thirty six (e.g., 3×12) PUCCH AN resources are available in one RB.

Figure 7:
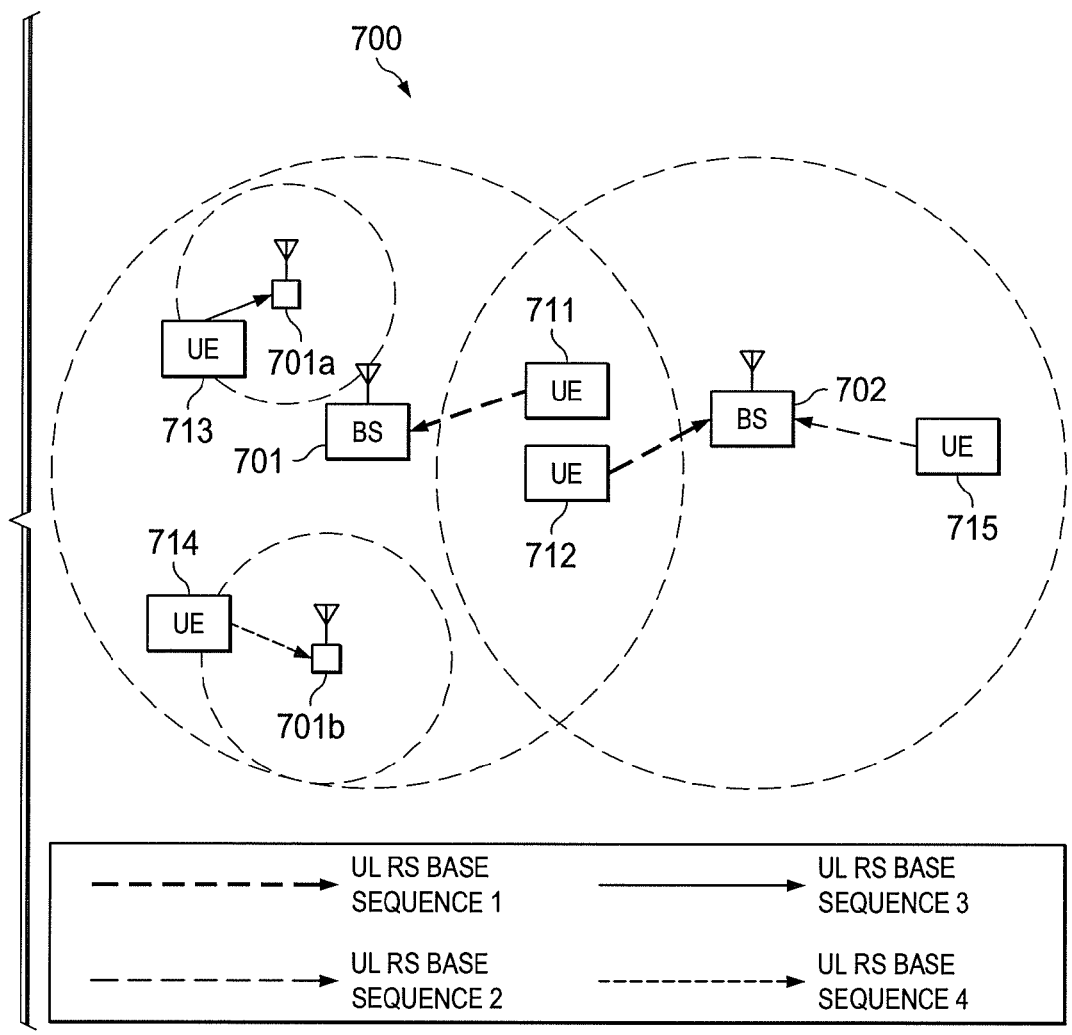
FIG. 7 illustrates wireless network that is capable of decoding data streams according to embodiments of the present disclosure.

FIG. 7 illustrates network 700 that is capable of decoding data streams according to embodiments of the present disclosure. The embodiment of the network 700 shown in FIG. 7 is for illustration only. Other embodiments could be used without departing from the scope of this disclosure.

In the illustrated embodiment, user equipments (UEs) 713 and 714 are connected to the base stations (BS) 701 having the cell ID of $N_{ID,1}^{cell}$, through to local base station 701a and 701b. User equipment 711 is directly connected to BS 701. Alternatively, UEs 712 and 715 are connected to BS 702 having the cell ID of $N_{ID,2}^{cell}$.

UEs 713 and 714 connected to BS 701 are located far from each other. UEs 712 and 715 connected to different BS 702 are also far from each other. However, UEs 711 and 712 are closely located but connected to two different base stations, that is, UE 711 is connected to BS 701 and SS 712 is connected to BS 702.

The user equipment that are closely located to interfere with another user equipment above a specified threshold, and connected to different cell from another user equipment respectively is denoted as 'high interfering user equipment' for this disclosure. For example, UEs 711 and 712 illustrated in FIG. 7 are the high interfering user equipments. The specified threshold can be adjusted in various levels to meet the service provider's requirements.

In certain embodiments, the network 700 can transmit to the user equipments both a cell specific radio resource control (RRC) configuration and an UE specific RRC configuration. The cell specific RRC configuration can include a cell specific resource offset parameter for the PUCCH HARQ-ACK. The UE specific configuration can include a UE specific RS base sequence parameter and a UE specific resource offset parameter for the PUCCH HARQ-ACK.

When the UE specific RRC configuration is applicable to the user equipment, the user equipment can transmit an UE specific PUCCH carrying HARQ-ACK, which is generated with an UE specific RS generated using UE specific RS base sequence parameter and an UE specific resource offset parameter for the PUCCH HARQ-ACK.

When the UE specific RRC configuration is not applicable to the user equipment, the user equipment can transmit a cell specific PUCCH carrying an HARQ-ACK, which is generated with the cell specific reference signal generated using the cell specific resource offset parameter for a PUCCH HARQ-ACK.

In certain embodiments, the network 700 can transmit the identical UE specific RS base sequence and UE specific resource offset parameters to the UEs 711 and 712 whose interference are higher than the specified threshold. Thus, the high interfering UEs 711 and 712 can transmit the coordinated PUCCH carrying HARQ-ACK information, which is generated using the identical UE specific RRC configuration.

In certain embodiments, the network 700 can transmit UE specific RRC configuration to the UEs such as UE 713, 714 and 715 whose interferences are lower than the specified threshold. Thus, the low interfering UEs can transmit the UE specific PUCCHs carrying HARQ-ACK information, which are generated based the UE specific RRC configurations.

In the embodiment, the network 700 can transmit the identical UE specific RS configuration base sequence parameter to the UEs 711 and 712. UEs 711 and 712 transmit the PUCCH carrying HARQ-ACK, using the same RS base sequence 1. Thus, UEs 711 and 712 cause a small UL interference to each other. On the other hand UEs 713, 714 and 715 transmit the UE specific PUCCH generated with the UE specific RS base sequences, which are RS base sequence 2, 3, and 4 respectively. Thus, the PUCCHs transmitted from the user equipments can be orthogonal each other. As mentioned above, the threshold to determine high interference or low interference can be adjusted to meet the service provider's various requirements.

Figure 8A:
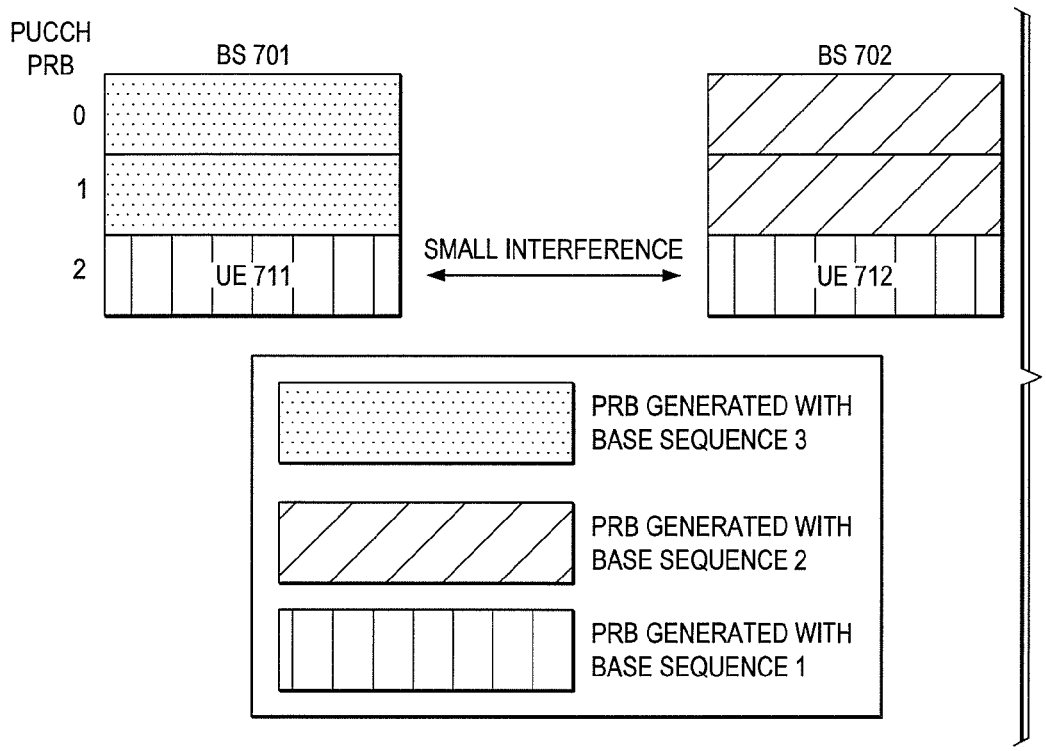
FIGS. 8A and 8B illustrate PUCCH physical resource blocks that are designated to interfering subscribers according to embodiments of the present disclosure.
Figure 8B:
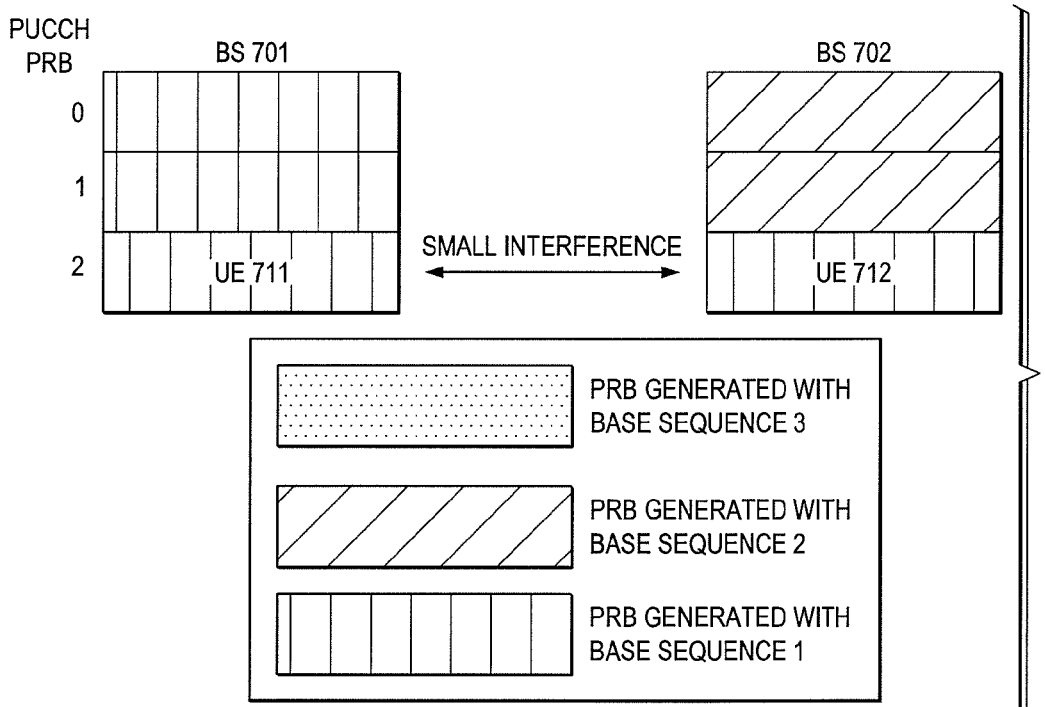

FIGS. 8A and 8B illustrate PUCCH physical resource blocks that are designated to the interfering user equipments according to embodiments of the present disclosure. The embodiments of the PUCCH physical resource blocks shown in FIGS. 8A and 8B are for illustration only. Other embodiments could be used without departing from the scope of this disclosure. UEs 711 and 712 transmit the coordinated PUCCH carrying HARQ-ACK, using the same RS base sequence 1. Thus, UEs 711 and 712 can reduce UL interference each other.

In certain embodiments, a resource index number for the PUCCH, $n_{PUCCH}^{(1)}$, is determined by the following equation:

$$n_{PUCCH}^{(1)} = n_{CCE} + N_{PUCCH}^{(1)} \quad \text{[EQN 1]}$$

In Equation 1, $n_{CCE}$ is a number of the smallest channel control element (CCE) used for transmission of a corresponding downlink control information scheduling a PDSCH for which the PUCCH carries the HARQ-ACK information, and $N_{PUCCH}^{(1)}$ is the UE specific resource offset parameter in case the UE specific RRC configuration is applicable to the user equipment; otherwise $N_{PUCCH}^{(1)}$ is the cell specific resource offset parameter.

In certain embodiments, the UE specific RRC configuration can contain an indication parameter indicating whether the UE specific RRC configuration or the cell specific RRC configuration is applicable to the user equipment. The indication parameter can have a value of TRUE or FALSE, wherein TRUE means that the UE specific RRC configuration is applicable to the user equipment and FALSE means that the cell specific RRC configuration is applicable to the user equipment.

In certain embodiments, $N_{PUCCH}^{(1)}$ can be derived from at least one of the CSI-RS configuration numbers associated with non-zero CSI-RS transmission power defined in Table 6.10.5.2-1 in 3GPP TS 36.211, version 10.1.0, "E-UTRA, Physical Channels And Modulation", the contents of which are hereby incorporated by reference and which is denoted as NCSI-RS for this disclosure as follows:

NCSI-RS can be the CSI-RS configuration number of the primary base station from which user equipment receives PDCCH;

NCSI-RS can be the smallest CSI-RS configuration number out of all such CSI-RS configuration numbers; NCSI-RS can be the largest CSI-RS configuration number out of all such CSI-RS configuration numbers; or NCSI-RS can be the CSI-RS configuration number with the smallest subframe configuration, an RRC parameter to configure CSI-RS subframe periodicity. Ties with more than one configuration numbers with the smallest subframe configuration, can be broken with either the smallest or the largest CSI-RS configuration number.

In certain embodiments, the network can semi-statically configure a set of N candidates for $N_{PUCCH}^{(1)}$ by RRC configuration, the network dynamically indicates one $N_{PUCCH}^{(1)}$ out of the N candidates by dynamic signaling.

For example, the number of the N candidates can be four and a two-bit information element (IE) is included in the PDCCH, e.g., corresponding to the downlink grant to generate four (4) candidate $n_{PUCCH}^{(1)}$s. $n_{PUCCH}^{(1)}$ can be selected among four (4) candidate $n_{PUCCH}^{(1)}$s, depending on the value of IE as followed in exemplary TABLE 1.

TABLE 1

| The two-bit IE indicating $n_{PUCCH}^{(1)}$ | Indicated $n_{PUCCH}^{(1)}$ value |
| --- | --- |
| 00 | The first $n_{PUCCH}^{(1)}$ value configured by RRC |
| 01 | The second $n_{PUCCH}^{(1)}$ value configured by RRC |
| 10 | The third $n_{PUCCH}^{(1)}$ value configured by RRC |
| 11 | The fourth $n_{PUCCH}^{(1)}$ value configured by RRC |

In certain embodiments, the number of the candidates N can be two and a one-bit information element (IE) is included in the PDCCH, e.g., corresponding to the downlink grant to generate two (2) candidate $n_{PUCCH}^{(1)}$s. One $n_{PUCCH}^{(1)}$ can be selected from two (2) candidate $n_{PUCCH}{}^{(1)}$s, depending on the value of IE as followed in exemplary TABLE 2.

TABLE 2

| The 1-bit IE indicating $n_{PUCCH}{}^{(1)}$ | Indicated $n_{PUCCH}{}^{(1)}$ value |
|---|---|
| 0 | The first $n_{PUCCH}{}^{(1)}$ value configured by RRC |
| 1 | The second $n_{PUCCH}{}^{(1)}$ value configured by RRC |

In certain embodiments, a resource index number for the PUCCH, $n_{PUCCH}{}^{(1)}$, is determined by the following equation:

$$n_{PUCCH}{}^{(1)} = n_{CCE} + N_{PUCCH}{}^{(1)} + N_{PUCCH,offset}{}^{(1)} \quad [\text{EQN 2}]$$

In Equation 2, $n_{CCE}$ is the number of the smallest channel control element (CCE) used for transmission of a corresponding downlink control information scheduling a PDSCH for which the PUCCH carries the HARQ-ACK information and $N_{PUCCH,offset}{}^{(1)}$ is the UE specific resource offset parameter in case the UE specific RRC configuration is applicable to the user equipment; otherwise $N_{PUCCH,offset}{}^{(1)}$ is the cell specific resource offset parameter.

In certain embodiments, $N_{PUCCH,offset}{}^{(1)}$ is derived from at least one of NCSI-RS as follows:

NCSI-RS can be the CSI-RS configuration number of the primary base station from which the user equipment receives PDCCH; NCSI-RS can be the smallest CSI-RS configuration number out of all such CSI-RS configuration numbers; NCSI-RS can be the largest CSI-RS configuration number out of all such CSI-RS configuration numbers; or NCSI-RS can be the CSI-RS configuration number with the smallest subframe-Config-r10, an RRC parameter to configure CSI-RS subframe periodicity. Ties with more than one configuration numbers with the smallest subframe configuration, can be broken with either the smallest or the largest CSI-RS configuration number.

Figure 9:
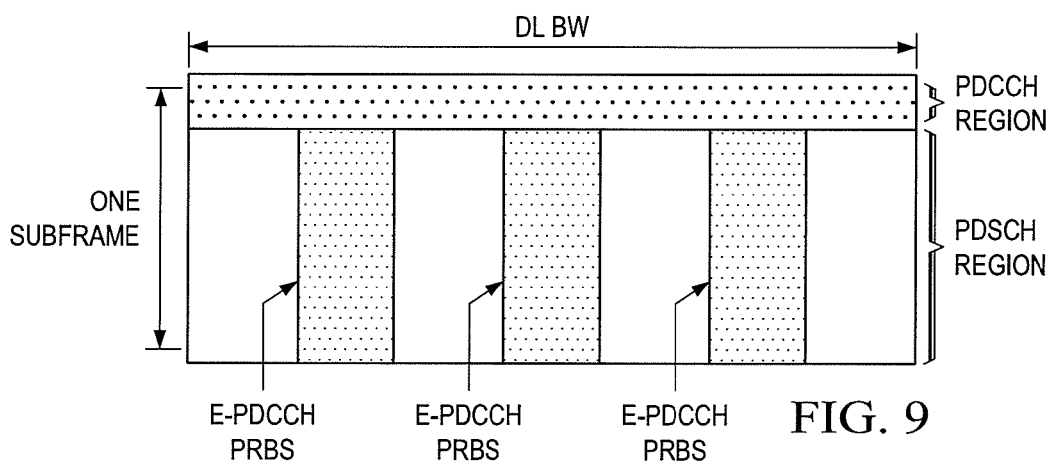
FIG. 9 illustrates downlink resources where enhanced PDCCHs (E-PDCCHs) are placed in the physical downlink shared channel (PDSCH) regions according to embodiments of the present disclosure.

FIG. 9 illustrates downlink resource where enhanced PDCCHs (E-PDCCHs) are placed in the PDSCH regions. The embodiment of the downlink resources shown in FIG. 9 is for illustration only. Other embodiments could be used without departing from the scope of this disclosure.

E-PDCCH 905 increases downlink (DL) control capacity within a base station and mitigates inter-cell interference for downlink control. In certain embodiments, a PUCCH format 1/1a/1b resource can be generated with reference signal (RS) base sequence that is depending on the location of DL grant, that is, whether PDCCH or E-PDCCH 905 is used for conveying a DL grant associated with the HARQ-ACK feedback.

In certain embodiments, a user equipment generates user equipment-specific RS base sequence for a PUCCH format 1/1a/1b when the user equipment receives the corresponding downlink control information carried in the E-PDCCH 905 region as shown in exemplary TABLE 3. For $n_{PUCCH}{}^{(1)}$ mapping when the user equipment receives the DL grant in the E-PDCCH 905 region, Equation 1 or 2 can be used with $n_{CCE}$ being the first CCE number carrying the DL grant in the E-PDCCH 905 region.

TABLE 3

| DL grant location | Base sequence generation method | $n_{PUCCH}{}^{(1)}$ mapping |
|---|---|---|
| PDCCH | Cell-specific | $n_{CCE}$ derived within the PDCCH region |

TABLE 3-continued

| DL grant location | Base sequence generation method | $n_{PUCCH}{}^{(1)}$ mapping |
|---|---|---|
| E-PDCCH | User Equipment-specific | $n_{CCE}$ derived within the E-PDCCH region |

According to one embodiment of the present disclosure, an user equipment can generate a uplink (UL) reference signal (RS) base sequence $\bar{r}_{u,v}(n)$, where v is equal to 0 for PUCCH and v is configured to be 0 or 1 for SRS by RRC, and a sequence group number u is derived from the following equation:

$$u = (f_{gh}(n_s) + f_{ss}) \bmod 30, \quad [\text{EQN 3}]$$

In Equation 3, $f_{gh}(n_s)$ is the group hopping pattern and $f_{ss}$ is sequence-shift pattern. $f_{ss}$ is equal to $f_{ss}{}^{PUCCH}$, the sequence-shift pattern for PUCCH when $f_{ss}$ is used for generating physical uplink control channel (PUCCH), or $f_{ss}$ is equal to $f_{ss}{}^{PUSCH}$, the sequence-shift pattern for PUSCH when $f_{ss}$ is used for generating physical uplink shared channel (PUSCH).

The group-hopping pattern $f_{gh}(n_s)$ is the same for both PUSCH and PUCCH and given by:

$$f_{gh}(n_s) = \begin{cases} 0 & \text{if group hopping is disabled} \\ \left(\sum_{i=0}^{7} c(8n_s + i) \cdot 2^i\right) \bmod 30 & \text{if group hopping is enabled,} \end{cases} \quad [\text{EQN 4}]$$

In Equation 4, the pseudo-random sequence c(i) is defined by section 7.2 in 3GPP TS No. 36.211, version 10.1.0, "E-UTRA, Physical Channels And Modulation", the contents of which are hereby incorporated by reference in their entirety. The pseudo-random sequence generator shall be initialized with $c_{init,SGH}$ at the beginning of each radio frame. Sequence hopping only applies for reference-signals of length $M_{sc}{}^{RS} \geq 6 N_{sc}{}^{RB}$. For reference-signals of length $M_{sc}{}^{RS} < 6 N_{sc}{}^{RB}$, the base sequence number v within the base sequence group is given by v=0. For reference-signals of length $M_{sc}{}^{RS} \geq 6 N_{sc}{}^{RB}$, the base sequence number v within the base sequence group in slot $n_s$ is defined by:

$$v = \begin{cases} c(n_s) & \text{if group hopping is disabled and sequence hopping is enabled} \\ 0 & \text{otherwise} \end{cases} \quad [\text{EQN 5}]$$

The parameter sequence-hopping-enabled provided by RRC determines whether sequence hopping is enabled or not. Sequence hopping for PUSCH can be disabled for a certain user equipment through the higher-layer parameter Disable-sequence-group-hopping despite being enabled on a cell basis. The pseudo-random sequence generator PUSCH shall be initialized with $c_{init} = c_{init,SGH} \cdot 2^5 + f_{ss}{}^{PUSCH}$ at the beginning of each radio frame.

In embodiments where sequence group hopping (SGH) is turned on, the sequence hopping (SH) initialization seed is determined by:

$$c_{init} = c_{init,SGH} + f_{ss}{}^{PUSCH}, \quad [\text{EQN 6}]$$

In Equation 6, where $f_{ss}^{PUSCH}$ is sequence-shift pattern for PUSCH and $c_{init,SGH}$ is the random seed for sequence group hopping (SGH).

In certain embodiments, the random seed for sequence group hopping (SGH) $c_{init}$ can be configured such that the interfering user equipments are assigned to same uplink (UL) reference signal (RS) base sequence.

In embodiments where sequence group hopping (SGH) is turned off, $f_{gh}(n_s)$ is equal to 0 and the sequence group number u is determined by only $f_{ss}$, or $u=f_{ss}$ mod 30. According to another embodiment of the present disclosure, the sequence-shift pattern $f_{ss}$ is configured using the following equation:

For physical uplink control channel (PUCCH) and sounding reference signal (SRS), $$f_{ss}^{PUCCH}=(N)\bmod 30 \qquad [\text{EQN 7}]$$

In Equation 7, N is the UE specific RS base sequence parameter in case the UE specific RRC configuration is applicable to the user equipment; otherwise N is the cell identification of the cell. N can be replaced with the sum of $N_{ID}^{cell}$ and $N_{UEoffset}^{PUCCH}$ which is configured by RRC configuration.

For physical uplink shared channel (PUSCH) demodulation reference signal (DM RS), $$f_{ss}^{PUSCH}=(f_{ss}^{PUCCH}+\Delta'_{ss})\bmod 30, \qquad [\text{EQN 8}]$$

In Equation 8, $f_{ss}^{PUCCH}$ is sequence-shift pattern for PUCCH and $\Delta'_{ss}$ is configured by RRC configuration.

In certain embodiments, $\Delta'_{ss}$ can be set to be $\Delta_{ss}$ as defined in 3GPP TS 36.211 version 8.9.0. which is hereby incorporated into the present disclosure as if fully set forth herein, and $N_{UEoffset}^{PUCCH}$ can be configured by RRC such as RRC or by dynamic signaling such that the interfering user equipments are assigned to same uplink (UL) reference signal (RS) base sequence.

In another embodiment of the present disclosure, $N_{UEoffset}^{PUCCH}$ can be zero and $\Delta'_{ss}$ can be user equipment-specifically configured by RRC such as RRC or dynamic signaling such that the high interfering user equipments are assigned to same uplink (UL) reference signal (RS) base sequence. Consequently, the sequence-shift patterns of PUCCH, PUSCH DM RS and SRS can be user equipment-specifically configured for the user equipments.

In certain embodiments, both $\Delta'_{ss}$ and $N_{UEoffset}^{PUCCH}$ can be configured by UE specific RRC configuration or dynamic signaling such that the high interfering user equipments are assigned to the same uplink (UL) reference signal (RS) base sequence parameter.

In certain embodiments, $N_{UEoffset}^{PUCCH}$ value can be configured from $\{0, 1, \ldots, 29\}$ by RRC or dynamic signaling such that the interfering user equipments are assigned to same uplink (UL) reference signal (RS) base sequence.

In certain embodiments, $\Delta'_{ss}$ value can be configured from $\{0, 1, \ldots, 29\}$ by RRC or dynamic signaling such that the interfering user equipments are assigned to same uplink (UL) reference signal (RS) base sequence.

In certain embodiments, $\Delta'_{ss}$ can be dynamically signaled in an uplink (UL) grant, e.g., downlink control indication (DCI) format 0 or DCI format 4. The dynamic signaling selects one $\Delta'_{ss}$ value out of N candidate $\Delta'_{ss}$ values such that the high interfering user equipments are assigned to same uplink (UL) reference signal (RS) base sequence.

In certain embodiments, $\Delta'_{ss}$ value is configured by RRC from $\{0, 1, \ldots, 29\}$ such that the high interfering user equipments are assigned to same uplink (UL) reference signal (RS) base sequence.

In certain embodiments, the network can semi-statically configure a set of N candidates for $\Delta'O_{ss}$ by RRC configuration, the network dynamically select one $\Delta'_{ss}$ out of the N candidates by PDCCH signaling such that the high interfering user equipments are assigned to same uplink (UL) reference signal (RS) base sequence.

For example, the number of the candidates N can be four and a two-bit information element (IE) can be included in the uplink (UL) grant as set in the following exemplary TABLE 4.

TABLE 4

| The two-bit IE indicating $\Delta_{SS}'$ | Indicated $\Delta_{SS}'$ value |
|---|---|
| 00 | The first $\Delta_{SS}'$ value configured by RRC |
| 01 | The second $\Delta_{SS}'$ value configured by RRC |
| 10 | The third $\Delta_{SS}'$ value configured by RRC |
| 11 | The fourth $\Delta_{SS}'$ value configured by RRC |

In another example, the number of the candidates N can be two, and a one-bit information element (IE) can be included in the UL grant as set in the following exemplary TABLE 5.

TABLE 5

| The one-bit IE indicating $\Delta_{SS}'$ | Indicated $\Delta_{SS}'$ value |
|---|---|
| 0 | The first $\Delta_{SS}'$ value configured by RRC |
| 1 | The second $\Delta_{SS}'$ value configured by RRC |

In certain embodiments, for aperiodic SRS (A-SRS), $N_{UEoffset}^{PUCCH}$ is signaled in a transmission grant, which can be either downlink (DL) grant or uplink (UL) grant such that the high interfering user equipments are assigned to same uplink (UL) reference signal (RS) base sequence.

The N candidate $N_{UEoffset}^{PUCCH}$ values are configured by a high layer such as RRC or dynamic signaling. For instance, N candidate $N_{UEoffset}^{PUCCH}$s values has a group of $\{0, 1, \ldots, 29\}$, or the N candidate $N_{UEoffset}^{PUCCH}$ can be indicated as $\Delta'_{ss}$ is indicated in TABLE 4 or TABLE 5.

In certain embodiments in which the SGH is turned off, for aligning the RS base sequence for the high interfering user equipments' PUCCHs, base station 701 can configure $N_{UEoffset}^{PUCCH}=u-N_{ID,1}^{cell}$ for user equipment 711 and base station 702 can configure $N_{UEoffset}^{PUCCH}=u-N_{ID,2}^{cell}$ for user equipment 712.

In certain embodiments, sequence-shift pattern $f_{ss}$ is configured using the following equation:

For physical uplink control channel (PUCCH) and sounding reference signal (SRS), $$f_{ss}^{PUCCH}=(N_{ID}^{cell}+N_{UEoffset}^{PUCCH})\bmod 30 \qquad [\text{EQN 9}];$$

and physical uplink shared channel (PUSCH) demodulation reference signal (DM RS), $$f_{ss}^{PUSCH}=(f_{ss}^{PUCCH}+\Delta_{ss}-N_{UEoffset}^{PUCCH})\bmod 30=$$
$$(N_{ID}^{cell}+\Delta_{ss})\bmod 30 \qquad [\text{EQN 10}]$$

$N_{UEoffset}^{PUCCH}$ can be configured by RRC or by dynamic signaling such that the high interfering user equipments are assigned to same uplink (UL) reference signal (RS) base sequence.

In certain embodiments, at least one of the sequence-shift patterns $f_{ss}^{PUCCH}$ and $f_{ss}^{PUSCH}$ can be configured by RRC or by dynamic signaling, where $f_{ss}^{PUSCH}$ or $f_{ss}^{PUSCH}$ can be configured from $\{0, 1, \ldots, 29\}$ such that the high interfering user equipments are assigned to same uplink (UL) reference signal (RS) base sequence.

In certain embodiments, the network can semi-statically configure a set of N candidates for $f_{ss}^{PUSCH}$ by RRC configuration and the network dynamically select one $f_{ss}^{PUSCH}$ out of the N candidates by PDCCH signaling such that the high interfering user equipments are assigned to same UL RS base sequence. For example, the number of the candidates N can be four and a two-bit information element (IE) can be included in the uplink (UL) grant as set in the following TABLE 8:

TABLE 8

| The two-bit IE indicating $f_{SS}^{PUSCH}$ | Indicated $f_{SS}^{PUSCH}$ value |
|---|---|
| 00 | The first $f_{SS}^{PUSCH}$ value configured by RRC |
| 01 | The second $f_{SS}^{PUSCH}$ value configured by RRC |
| 10 | The third $f_{SS}^{PUSCH}$ value configured by RRC |
| 11 | The fourth $f_{SS}^{PUSCH}$ value configured by RRC |

In another example, the number of the candidates N can be two, and a one-bit information element (IE) is included in the UL grant as set in the following TABLE 9.

TABLE 9

| The one-bit IE indicating $f_{SS}^{PUSCH}$ | Indicated $f_{SS}^{PUSCH}$ value |
|---|---|
| 0 | The first $f_{SS}^{PUSCH}$ value configured by RRC |
| 1 | The second $f_{SS}^{PUSCH}$ value configured by RRC |

In another embodiment, for aperiodic SRS (A-SRS), $f_{ss}^{PUCCH}$ can be signaled in a transmission grant, which can be either downlink (DL) grant or uplink (UL) grant configured such that the high interfering user equipments are assigned to same uplink (UL) reference signal (RS) base sequence. The N candidate $f_{ss}^{PUCCH}$ values can be configured by a high layer such as RRC or dynamic signaling. For example, N candidate $f_{ss}^{PUCCH}$s values has a group of $\{0, 1, \ldots, 29\}$, or the N candidate $f_{ss}^{PUCCH}$ can be indicated as $f_{ss}^{PUSCH}$ indicated in TABLE 8 or TABLE 9.

According to the present disclosure, the PUCCH decoding performance is improved. That is, the decoding failure probability with the same transmission power is decreased. The performance gain thanks to the UE specific RS base sequence configuration mainly comes from the following aspects: Reduced PUCCH interference as now the two PUCCH signals are orthogonally multiplexed and Cooperation gain in case of UL Cooperative Multi-Point (CoMP) reception in which case two cells cooperative to decode the PUCCHs generated with same RS base sequence. In coordinate multipoint (CoMP) scenario 4 where a large number of user equipments are connected to a same macro base station, uplink cell splitting gain can be increased by assigning UE specific RRC configuration.

As used in this disclosure, coordinated multipoint (CoMP) transmission points (TPs) refer to transmitters associated with a CoMP transmission to a user equipment (UE) in a subframe. TPs can include remote radio heads (RRHs), macro eNodeBs, femto eNodeBs, pico eNodeBs, base stations, and the like. In some embodiments, CoMP TPs can have different cell IDs. In other embodiments, CoMP TPs can share the same cell IDs. Coordinated multipoint (COMP) reception points (RPs) refer to receivers associated with a CoMP transmission from a user equipment (UE) in a subframe. RPs can include remote radio heads (RRHs), macro eNodeBs, femto eNodeBs, pico eNodeBs, base stations, and the like. In some embodiments, CoMP RPs can have different cell IDs. In other embodiments, CoMP RPs can share the same cell IDs.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A user equipment capable of receiving communications from a cell comprising at least one base station, the user equipment (UE) comprising:
 a receiver configured to receive from the base station both a cell specific radio resource control (RRC) configuration comprising a cell specific resource offset parameter for a PUCCH carrying a HARQ-ACK, and a UE specific RRC configuration comprising a UE specific RS base sequence parameter and an UE specific resource offset parameter for the PUCCH carrying the HARQ-ACK; and
 a transmitter configured to transmit the PUCCH carrying the HARQ-ACK which is generated based on either the cell specific RRC configuration or the UE specific RRC configuration,
 wherein a resource index number for the PUCCH, $n_{PUCCH}^{(1)}$, is determined by the following equation:

$$n_{PUCCH}^{(1)} = n_{CCE} + N_{PUCCH}^{(1)},$$

where $n_{CCE}$ is a number of the smallest channel control element (CCE) used for transmission of a corresponding downlink control information scheduling a PDSCH for which the PUCCH carries the HARQ-ACK, and $N_{PUCCH}^{(1)}$ is the UE specific resource offset parameter depending on the applicability in case the UE specific RRC configuration is applicable to the user equipment; otherwise $N_{PUCCH}^{(1)}$ is the cell specific resource offset parameter.

2. The user equipment as set forth in claim 1, wherein the UE specific RRC configuration contains an indication parameter indicating whether the UE specific RRC configuration or the cell specific RRC configuration is applicable to the user equipment.

3. The user equipment as set forth in claim 1, wherein the UE specific RRC configuration is applicable to the user equipment in case that the user equipment receives the corresponding downlink control information carried in an enhanced-PDCCH; the cell specific RRC configuration is applicable to the user equipment in case that the user equipment receives the corresponding downlink control information carried in a PDCCH region.

4. The user equipment as set forth in claim 1, wherein in case that the user equipment interferes with another user equipment connected to another cell above a specified threshold, the identical UE specific RS base sequence and UE specific resource offset parameters are transmitted to the user equipments.

5. The user equipment as set forth in claim 1, wherein the UE specific resource offset parameter is selected from at least one of a number of CSI-RS configuration numbers associated with non-zero CSI-RS transmission power.

6. The user equipment as set forth in claim 1, wherein the reference signal (RS) is generated by a sequence group number u derived from the following equation:

$$u=(f_{gh}(n_s)+f_{ss}) \bmod 30,$$

where $f_{gh}(n_s)$ is a group hopping pattern and $f_{ss}$ is a sequence-shift pattern.

7. The user equipment as set forth in claim 6, wherein $f_{ss}$ is equal to a sequence-shift pattern for the PUCCH $f_{ss}^{PUCCH}$, the sequence-shift pattern for the PUCCH $f_{ss}^{PUCCH}$ is determined by the following equation:

$$f_{ss}^{PUCCH}=(N) \bmod 30,$$

wherein N is the UE specific RS base sequence parameter in case the UE specific RRC configuration is applicable to the user equipment; otherwise N is a cell identification of the cell.

8. For use in a wireless communications network comprising a plurality of cell including at least one base station, each one of the base stations capable of wireless communications with a plurality of user equipments, the base station comprising:
a transmitter configured to transmit to the user equipment both a cell specific radio resource control (RRC) configuration comprising a cell specific resource offset parameter for a PUCCH carrying a HARQ-ACK, and a UE specific RRC configuration comprising a UE specific RS base sequence parameter and an UE specific resource offset parameter for the PUCCH carrying the HARQ-ACK; and
a receiver configured to receive the PUCCH carrying the HARQ-ACK which is generated based on either the cell specific RRC configuration or the UE specific RRC configuration,
wherein a resource index number for the PUCCH, $n_{PUCCH}^{(1)}$, is determined by the following equation:

$$n_{PUCCH}^{(1)}=n_{CCE}+N_{PUCCH}^{(1)}$$

where $n_{CCE}$ is a number of the smallest channel control element (CCE) used for transmission of a corresponding downlink control information scheduling a PDSCH for which the PUCCH carries the HARQ-ACK, and $N_{PUCCH}^{(1)}$ is the UE specific resource offset parameter in case the UE specific RRC configuration is applicable to the user equipment; otherwise $N_{PUCCH}^{(1)}$ is the cell specific resource offset parameter.

9. The base station as set forth in claim 8, wherein the UE specific RRC configuration contains an indication parameter indicating whether the UE specific RRC configuration or the cell specific RRC configuration is applicable to the user equipment.

10. The base station as set forth in claim 8, wherein the UE specific RRC configuration is applicable to the user equipment in case that the user equipment receives the corresponding downlink control information carried in an enhanced-PDCCH; the cell specific RRC configuration is applicable to the user equipment in case that the user equipment receives the corresponding downlink control information carried in a PDCCH region.

11. The base station as set forth in claim 8, wherein in case that the user equipment interferes with another user equipment connected to another cell above a specified threshold, the identical UE specific RS base sequence and UE specific resource offset parameters are transmitted to the user equipments.

12. The base station as set forth in claim 8, wherein the UE specific resource offset parameter is selected from at least one of a number of CSI-RS configuration numbers associated with non-zero CSI-RS transmission power.

13. The base station as set forth in claim 8, wherein the reference signal (RS) is generated by a sequence group number u derived from the following equation:

$$u=(f_{gh}(n_s)+f_{ss}) \bmod 30,$$

where $f_{gh}(n_s)$ is a group hopping pattern and $f_{ss}$ is a sequence-shift pattern.

14. The base station as set forth in claim 8, wherein $f_{ss}$ is equal to a sequence-shift pattern for the PUCCH $f_{ss}^{PUCCH}$, the sequence-shift pattern for the PUCCH $f_{ss}^{PUCCH}$ is determined by the following equation:

$$f_{ss}^{PUCCH}=(N) \bmod 30,$$

wherein N is the UE specific RS base sequence parameter in case the UE specific RRC configuration is applicable to the user equipment; otherwise N is a cell identification of the cell.

15. For use in a wireless communications network, a method for interference mitigation, the method comprising:
transmitting to a user equipment both a cell specific radio resource control (RRC) configuration comprising a cell specific resource offset parameter for a PUCCH carrying a HARQ-ACK, and a specific RRC configuration comprising a UE specific RS base sequence parameter and an UE specific resource offset parameter for the PUCCH carrying the HARQ-ACK; and
receiving the PUCCH which is generated based on either the cell specific RRC configuration or the UE specific RRC configuration,
wherein a resource index number for the PUCCH, $n_{PUCCH}^{(1)}$, is determined by the following equation:

$$n_{PUCCH}^{(1)}=n_{CCE}+N_{PUCCH}^{(1)}$$

where $n_{CCE}$ is a number of the smallest channel control element (CCE) used for transmission of a corresponding downlink control information scheduling a PDSCH for which the PUCCH carries the HARQ-ACK, and $N_{PUCCH}^{(1)}$ is the UE specific resource offset parameter in case the UE specific RRC configuration is applicable to the user equipment; otherwise $N_{PUCCH}^{(1)}$ is the cell specific resource offset parameter.

16. The method as set forth in claim 15, wherein the UE specific RRC configuration contains an indication parameter indicating whether the UE specific RRC configuration or the cell specific RRC configuration is applicable to the user equipment.

17. The method as set forth in claim 15, wherein the UE specific RRC configuration is applicable to the user equipment in case that the user equipment receives the corresponding downlink control information carried in enhanced-PDCCH; the cell specific RRC configuration is applicable to the user equipment in case that the user equipment receives the corresponding downlink control information carried in a PDCCH region.

18. The method as set forth in claim 15, wherein in case that the user equipment interferes with another user equipment connected to another cell above a specified threshold, the identical UE specific RS base sequence and UE specific resource offset parameters are transmitted to the user equipments.

19. The method as set forth in claim 15, wherein the UE specific resource offset parameter is selected from at least one of a number of CSI-RS configuration numbers associated with non-zero CSI-RS transmission power.

20. The method as set forth in claim 15, wherein the reference signal (RS) is generated by a sequence group number u derived from the following equation:

$$u = (f_{gh}(n_s) + f_{ss}) \bmod 30,$$

where $f_{gh}(n_s)$ is a group hopping pattern and $f_{ss}$ is a sequence-shift pattern.

21. The method as set forth in claim 15, wherein $f_{ss}$ is equal to a sequence-shift pattern for the PUCCH $f_{ss}^{PUCCH}$, the sequence-shift pattern for the PUCCH $f_{ss}^{PUCCH}$ is determined by the following equation:

$$f_{ss}^{PUCCH} = (N) \bmod 30,$$

wherein N is the UE specific RS base sequence parameter in case the UE specific RRC configuration is applicable to the user equipment; otherwise N is a cell identification of the cell.

* * * * *